May 27, 1958　　　G. E. WHITE ET AL　　　2,836,803
INDUCTIVE TRANSDUCER
Filed March 30, 1953　　　　　　　　　　5 Sheets-Sheet 1
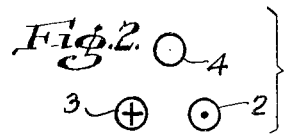
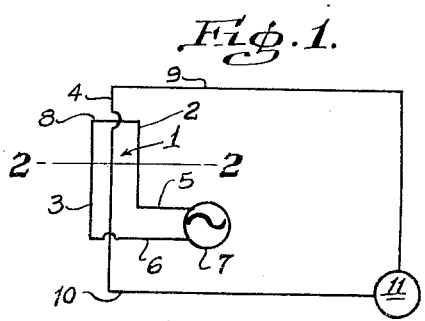
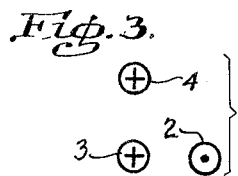
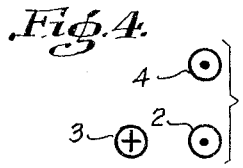
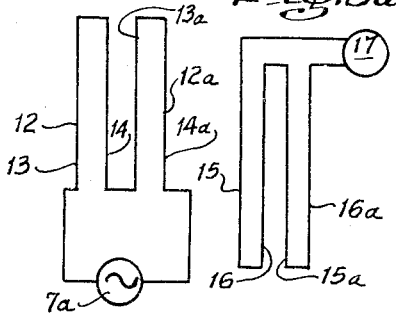
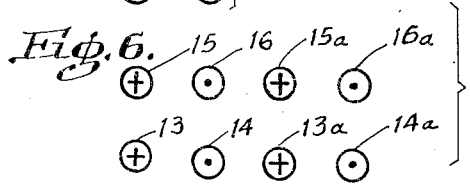
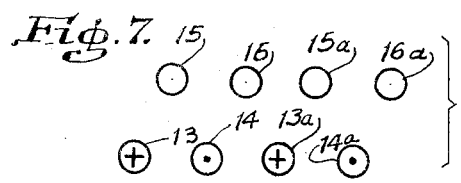
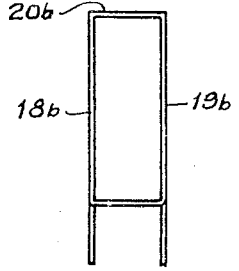
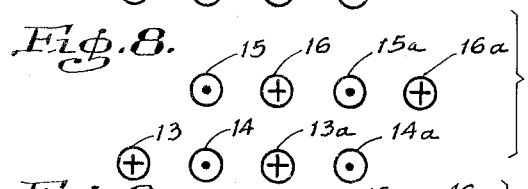
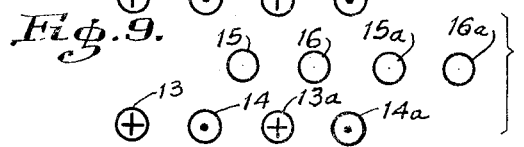
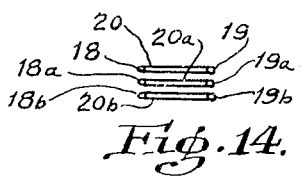
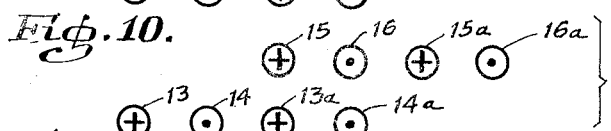
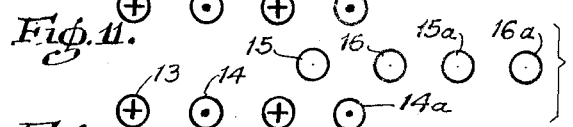
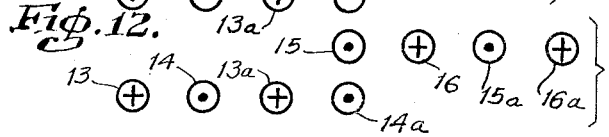
INVENTORS,
GIFFORD E. WHITE
and EARL W. GRANT
By
ATTORNEY.

May 27, 1958  G. E. WHITE ET AL  2,836,803
INDUCTIVE TRANSDUCER
Filed March 30, 1953  5 Sheets-Sheet 2
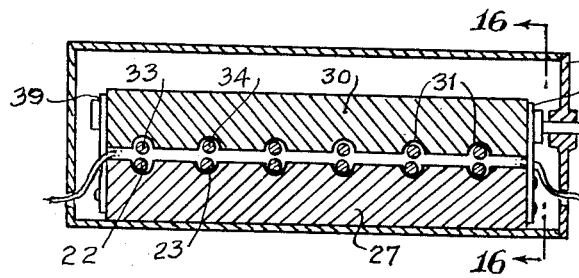
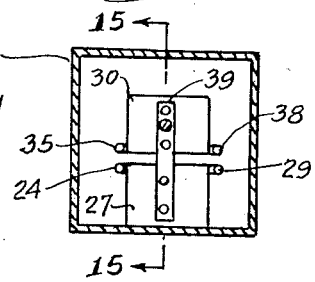
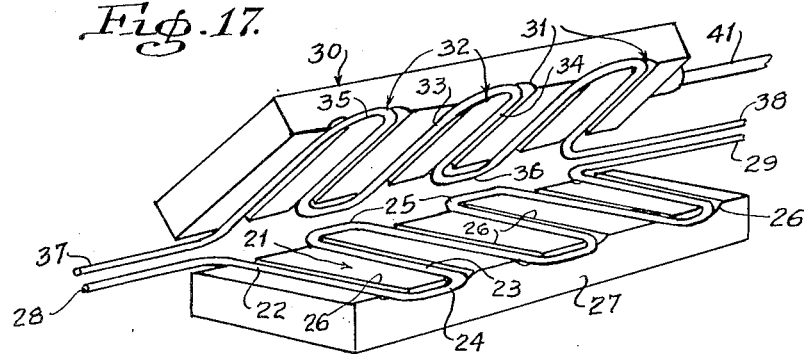
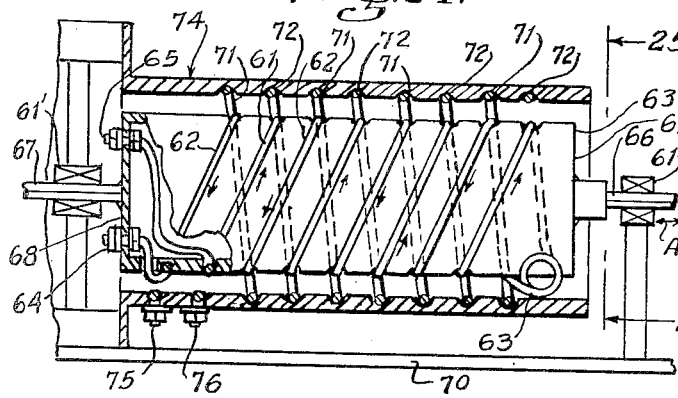
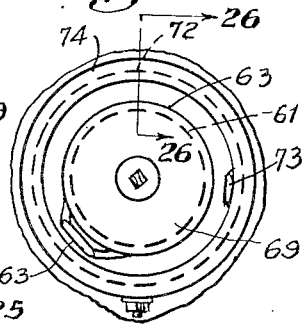
INVENTORS
GIFFORD E. WHITE
and EARL W. GRANT
By
ATTORNEY.

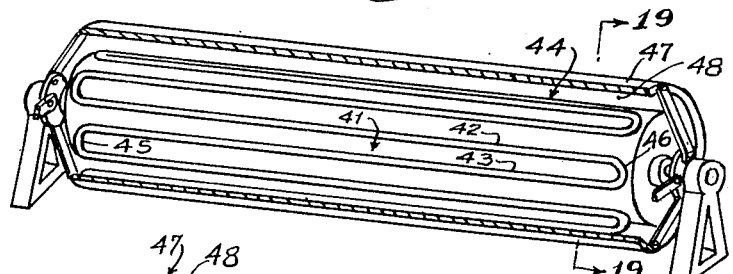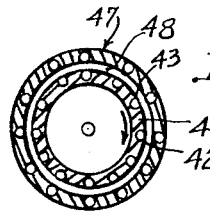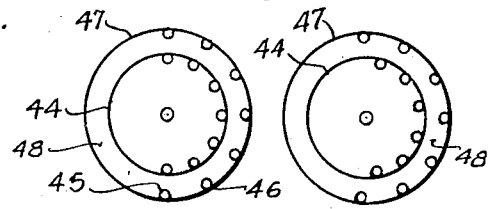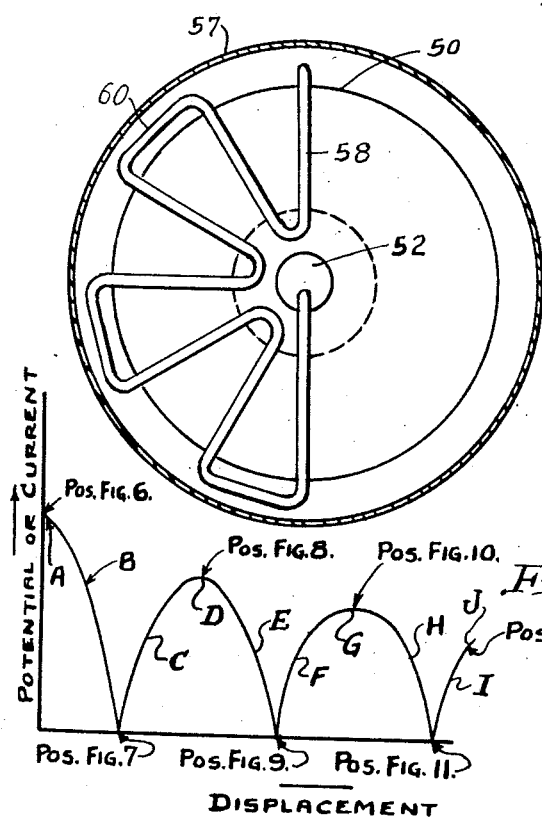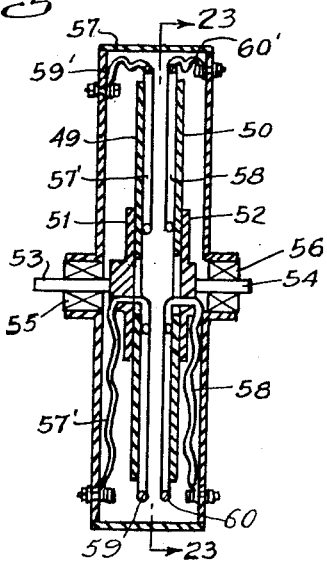

May 27, 1958 G. E. WHITE ET AL 2,836,803
INDUCTIVE TRANSDUCER
Filed March 30, 1953 5 Sheets-Sheet 4

INVENTORS.
GIFFORD E. WHITE
and EARL W. GRANT
BY
ATTORNEY.

May 27, 1958 G. E. WHITE ET AL 2,836,803
INDUCTIVE TRANSDUCER
Filed March 30, 1953 5 Sheets-Sheet 5
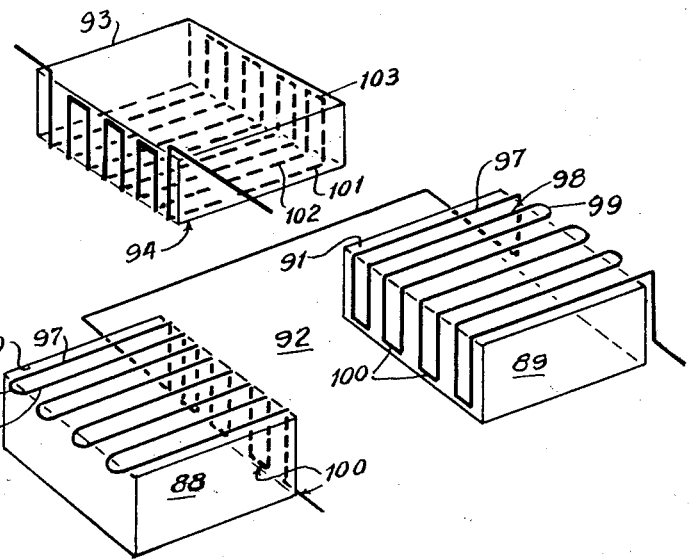
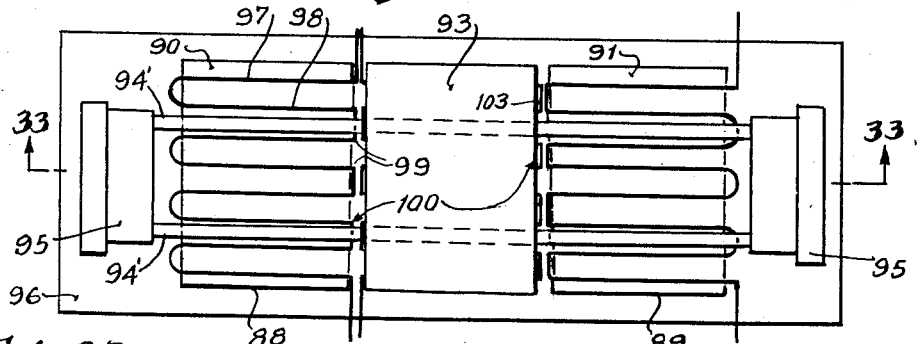
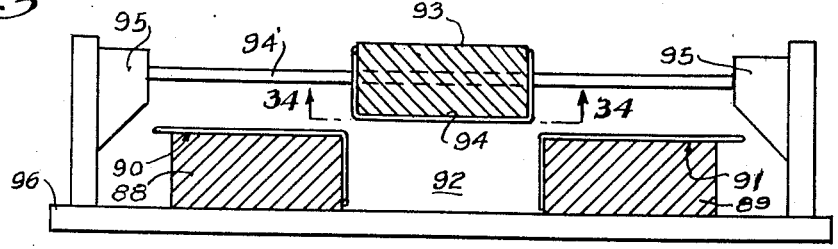
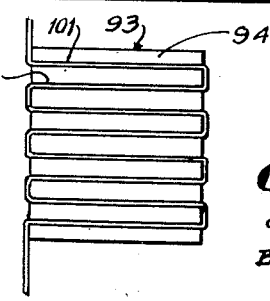
INVENTORS.
GIFFORD E. WHITE
and EARL W. GRANT
By
ATTORNEY.

United States Patent Office 2,836,803
Patented May 27, 1958

2,836,803
INDUCTIVE TRANSDUCER

Gifford E. White, Austin, Tex., and Earl W. Grant, Los Angeles, Calif., assignors to Statham Instruments, Inc., a corporation of California Application March 30, 1953, Serial No. 345,352

3 Claims. (Cl. 336—119)

This invention relates to motion sensing devices such as displacement meters, velocimeters, accelerometers employing a transducer which embodies a transformer.

In the transducer of our invention, we employ two electrical conductor elements which are displaceable with respect to each other. One of the said conductors may be termed the primary of the transformer and the other the secondary of the transformer. In the primary, we provide two or more conductors, so arranged that the direction of current flow in one conductor is directed in a direction opposite to the direction of current flow in an adjacent conductor so that there is a reversal in direction of current flow when going from one conductor to an adjacent conductor. We then provide a secondary conductor which is magnetically coupled with but not in electrical contact with the said primary conductors. We find that where the secondary and primary are displaced with respect to each other so that the secondary departs from one of the primary conductors and approaches an adjacent conductor of the primary without making electrical contact therewith, the current induced in the secondary is at a maximum when the secondary conductor is spatially closest to one of the conductor elements of the primary and at a minimum when midway between the said conductors.

Preferably the adjacent conductors of the primary should be arranged about a line of symmetry such that a conductor of the secondary, moving between the adjacent conductor, may take a position in which all parts of the secondary conductor are equally influenced magnetically by each of the adjacent windings in which currents, spatially of opposite phase to each other, are flowing. Geometrically this may be accomplished by arranging and spacing the adjacent conductors such that parts of the secondary positioned between the primary conductors when such parts of the secondary conductor is positioned midway between the primary conductors, are equally spaced between the primary conductors on each side of the secondary conductor.

Generically stated, our transducer is characterized by a primary having adjacent conductor elements such that the magnetic field induced by currents in such conductor alternates in polarity between adjacent conductors of the primary; the magnetic field reversing in direction in passing from one conductor to an adjacent conductor of the primary and means for moving a secondary through said field from the field adjacent each conductor to the field of the adjacent conductor of the primary.

These and other advantages and objects of our invention will be understood by reference to the drawings, in which Fig. 1 shows in schematic form an elementary circuit with the secondary at the position where minimum coupling is obtained;

Fig. 2 is a section taken on the line 2—2 of Fig. 1;

Fig. 3 is a section similar to Fig. 2 but showing one position of maximum coupling;

Fig. 4 is a section similar to Fig. 2 but showing the other position of maximum coupling;

Fig. 5 is an elementary circuit for a serpentine winding for the primary and Fig. 5—a for the secondary, employing the principle of the invention;

Fig. 6 is a section similar to Fig. 2 but showing the initial position of a circuit employing the windings shown in Fig. 5 and Fig. 5—a, and for the position of maximum coupling;

Figs. 7, 8, 9, 10, 11, and 12 are sections similar to Fig. 2 but showing the position of the primary and secondary of the transducer transformer employing the windings of Fig. 5 and Fig. 5—a as the secondary and primary are translated with respect to each other;

Fig. 13 is a plan view of an alternative primary or secondary winding for a transducer embodying our invention;

Fig. 14 is an end view of Fig. 13;

Fig. 15 is a vertical section of a transformer employing the invention, taken on line 15—15 of Fig. 16;

Fig. 16 shows a side view of Fig. 15 taken on line 16—16 of Fig. 15;

Fig. 17 is a perspective view of the primary and secondary elements of the transducer of Fig. 15;

Fig. 18 shows another form of our transducer with parts in section and parts in elevation;

Fig. 19 is a sectional view on line 19—19 of Fig. 18;

Fig. 20 is a schematic sectional view similar to Fig. 19, showing one position of the secondary and primary windings;

Fig. 21 is a schematic sectional view similar to Fig. 20 showing another position of the secondary and primary windings;

Fig. 22 is a vertical section through another form of transducer;

Fig. 23 is a section taken on line 23—23 of Fig. 22.

Figure 27:
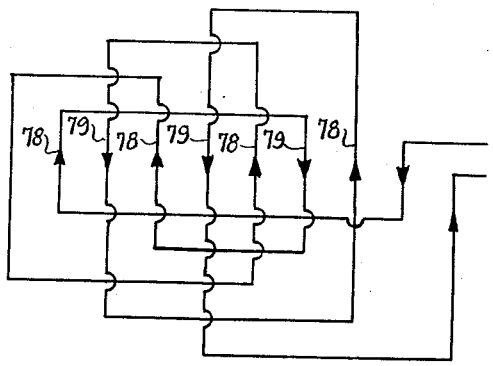
Figure 28:
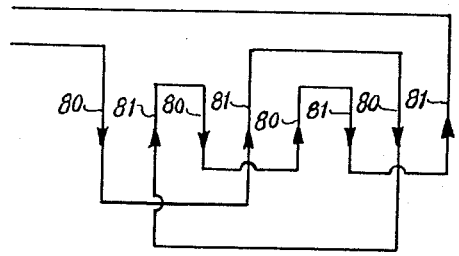
Figure 29:
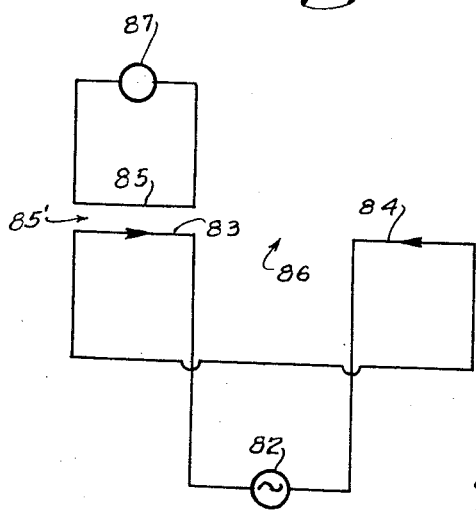
Figure 30:
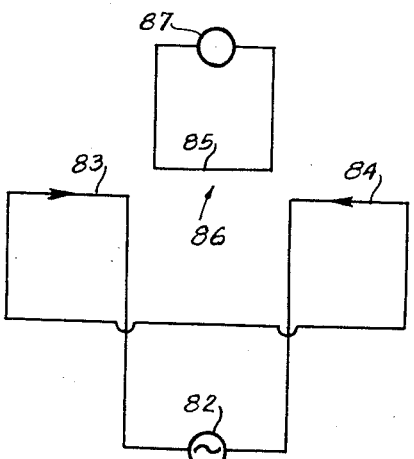

Fig. 23a is a graph of the voltage induced in the secondary as the secondary takes the position shown successively at Figs. 6 to 12, inclusive;

Fig. 24 is a view partly in section and partly in elevation of another form of the transducer of our invention;

Fig. 25 is a section on line 25—25 of Fig. 24;

Fig. 26 is a fragmentary section on line 26—26 of Fig. 25;

Fig. 27 is an elementary schematic wiring diagram of one form of the windings of the primary or secondary of the transducer of our invention;

Fig. 28 is an elementary schematic wiring diagram of another form of the windings of the primary or the secondary of the transducer of our invention;

Fig. 29 is an elementary wiring diagram of one position of the primary and secondary of another form of the transducer of our invention;

Fig. 30 is an elementary schematic wiring diagram of another position of the primary and secondary of the form of transducer of our invention illustrated in Fig. 29;

Fig. 31 is a schematic expanded view of the transducer illustrated by Figs. 29 and 30;

Fig. 32 is a plan view of the transducer shown in Fig. 31;

Fig. 33 is a section taken on line 33—33 of Fig. 32;

Fig. 34 is a fragmentary view taken on line 34—34 of Fig. 33; and

Figure 35:
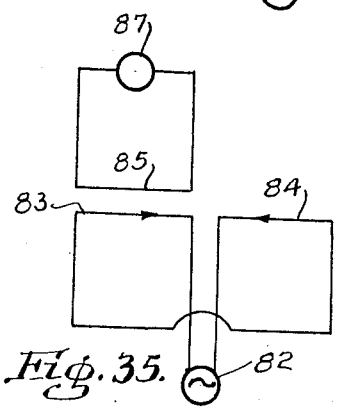
Figure 36:
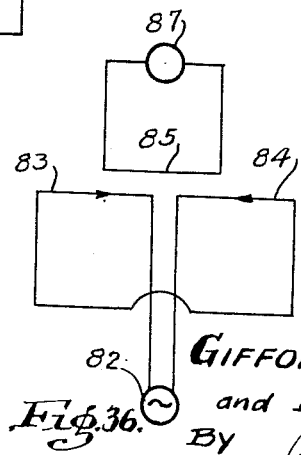

Fig. 35 is an elementary wiring diagram of another form of the transducer of our invention; and Fig. 36 shows the transducer of Fig. 35 in a different position from Fig. 35.

Referring to Fig. 1, the loop 1 is formed of two parallel electrical conductors 2 and 3, such as copper wire connected by a conductor 8 and connected by conductors 5 and 6 to a source of alternating current.

A conductor 4 extends parallel to the conductors 2 and 3 and connected by conductors 9 and 10 to a meter 11 to measure potential or current in the conductor 4. Conductor 4, which also may be a metallic wire such as copper wire, parallel to conductors 2 and 3, is spaced from the conductors 3 and 2 and electrically isolated from 2 and 3, and separated by a volume of low permeability such as for example, an air gap.

It will be apparent that any current flowing in 2 is 180° out of phase to the current in 3. The direction of the magnetic field resulting from the current flowing in 2 is 180° out of phase with the magnetic vector of the field resulting from the current flowing in 3. Thus, assume that at any instant of time and current, 2 and 3 are of identical cross-section and magnetic permeability, as indicated in Figs. 2 to 4, inclusive; then ignoring any stray magnetic fields, if conductor 4 is placed so that its axis is in a plane midway between conductors 2 and 3, the conductor being under the influence equally of two equal magnetic fields 180° out of phase with each other, no current will be induced in 4. Thus, by placing conductors 2 and 3 symmetrically about an axis between them and placing the conductor 4 so that the conductor is equally but oppositely influenced magnetically by the conductors 2 and 3, as shown in Fig. 2, no current flows in 4. If 4 is moved from the position in Fig. 2 to the position in Fig. 3, where it is placed directly above conductor 3, a potential (and current) will be induced in 4 which increases in magnitude as the conductor 4 moves toward conductor 3 and becomes a maximum when the axis of 4 is in the same plane with the axis of 3.

It will be seen that the conductor in any position between a plane through the axis of one winding and the central plane between adjacent conductors is magnetically influenced solely by the magnetic field of the said one conductor. When the secondary conductor is moved so that the volume of the conductor intercepts the central plane, it becomes magnetically influenced by a magnetic field the direction vectors of which are of opposite sign and add algebraically. When the axis of the secondary is in the central plane (assuming symmetry of the primary conductors about the plane and equal but reversed magnetic fields from both adjacent conductors) the influence of the magnetic fields of adjacent conductors cancel out. It is in this sense that the secondary conductor may be said to be in magnetic coupling with one only of the conductors of the primary and not with the distributed magnetic field of all of the primary conductors adjacent the secondary conductor.

With the conductor 4 over the conductor 3, current flowing in 4 will be in phase with the current flowing in 3. In like manner when the conductor 4 is moved from the position in Fig. 2 to the position in Fig. 4, a potential is induced in 4 which increases in magnitude as it is moved to the position in Fig. 4 in which the axis of the conductor 4 is in the same plane as the axis of the conductor 2. The current flowing in 4 is in phase with the current flowing in 2. Thus a reversal of phase in the direction of the current flow occurs in passing from the position of Fig. 2 to the position of Fig. 3. Since the voltage varies continuously, rising from a minimum to a maximum in passing from the position of Fig. 2 to either the position of Figs. 3 or 4, by calibrating this motion for a given current flow impressed by the conductors 3 and 2, the voltage across conductor 4 (or current in 4) may be correlated with displacement. A motion sensing device can be obtained whereby, upon displacement of conductor 4 from any initial position, the current or voltage flowing in 4 will give the degree of displacement of the secondary from any initial position.

The properties and functions of the above system is applicable when the conductor 4 is the primary and conductors 2 and 3 form the secondary of the transformer.

In the form shown in Figs. 1 to 4, the principle is illustrated as applied to a loop formed by cross connecting 3 and 4 by a conductor 8 in a loop of which 2 and 3 form the parallel legs of the loop (see Fig. 1). The conductor 4 of the secondary is also parallel to the conductors 2 and 3 and is spaced therefrom so as to be magnetically coupled but not in electrical contact with the conductors 2 or 3. A source of alternating current 7 is connected by conductors 5 and 6 to the conductors 2 and 3 and a meter 11 connected by conductors 9 and 10 to the secondary 4 reads or records any electrical characteristic resulting from the magnetic coupling, as, for example, voltage or current. In this form the motion to be recorded is thus limited practically to movements between the positions shown in Figs. 3 and 4. This is because in any continued movement of the conductor 4 to the right of the conductor 2, the current induced in 4 will gradually diminish as result of the increase in the volume of the air gap. The motion sensing device in this region will be so insensitive as to be practically useless. In this region of motion of the device, the important advantage of moving between two magnetic fields induced by adjacent conductors in which the current is 180° out of phase is not employed.

By employing a plurality of loops connected in series it is possible to increase the range of the instrument, i. e., the amount of motion of the primary and the secondary of the transformer which may be effectively sensed and at the same time increase for any given potential across the primary, the voltage across and current in the secondary.

Thus Fig. 5 shows an elementary wiring diagram of a primary composed of loops, shown as loops 12 and 12a, connected in series. Fig. 5a shows an elementary wiring diagram of a similar secondary of loops connected in series. Each loop is formed of two parallel leg conductors. In the primary the legs 13, 14, 13a and 14a are parallel, as are the legs 15, 16, 15a and 16a of the secondary which are also parallel to the legs of the primary. The legs 13 and 14a are connected to a source of alternating current 7a and the legs 15 and 16a are connected to an electrical meter 17.

From what was said before it will be apparent that in the primary (loops 12 and 12a) for any current direction in 13, as indicated in Fig. 6, the current in 13a of the similar legs of the next adjacent loop will be in the same direction, while the current direction in the other legs 14 and 14a of the primary will be 180° out of phase with the current direction in the complementary legs 13 and 13a. By spacing the legs 13, 14, 13a and 14a at equal distances from each other and spacing the equally spaced legs 15, 16, 15a and 16a of the secondary from the complementary legs 13, 14, 13a and 14a of the primary an inductive type transducer in which each element of the secondary is in series and has an equal value of current and voltage induced therein is obtained. Such a transducer also has the additional property not possessed by the forms illustrated in Figs. 1 to 4, inc. that the range of motion which can be sensed with great sensitivity is larger than the spacing between the legs of the loop.

Assume that in Fig. 6 the current induced in the secondary legs 15, 16, 15a and 16a inclusive, when the current flow at any instant of time, resulting from imposing an alternating current in the primary windings, will be as shown in Fig. 6, and the current flow or the potential as read on 17 will be at a maximum, as is illustrated by the graph of Fig. 23a. As was described in connection with the form shown in Figs. 1 to 4, inclusive, as the secondary is displaced to the right from Fig. 6 to Fig. 7, the conductors 15, 16, 15a, and 16a move toward the central plane between adjacent conductors of the primary and the voltage or current induced in the secondary diminishes until, when the conductors reach the portion shown in Fig. 7, with the conductor legs of the secondary midway between the complementary conductors 13, 14, 13a and 14a of the primary, the induced potential and current reach a minimum.

Referring to Fig. 23a, the current or voltage in the secondary moves along curve B in moving from the value A at position of Fig. 6, to some minimum value at the position of Fig. 7. Similarly, as the secondary is moved from the position of Fig. 7 to the position of Fig. 8, the current and potential rise along the curve C to another maximum D, as shown at position of Fig. 8. But it will be observed that only three of the conductors of the secondary, i. e., 15, 16, and 15a, are coupled with three of the conductors of the primary, i. e., 14, 13a, and 14a, and that conductor 13 is uncoupled magnetically with the secondary and that the conductor 16a is separated by a relatively large air gap from conductor 14a. Additionally, the current flow in 16a is 180° out of phase with the direction of current flow in 14a. The conductor 16a thus makes substantially no contribution to the potential or current induced in the secondary, whereas in the situation of Fig. 6, all of the secondary conductors may be made to be substantially equal contributors to the induced potential and current. The induced current and voltage in the secondary are thus less as is indicated by the lesser value of point D than point A obtained at the position of Fig. 6 when all of the conductors of the secondary are in the position of maximum couple with the conductors of the primary loops, as shown in Fig. 6.

Similarly, as the secondary is moved from the position of Fig. 8 successively to the position of Figs. 9, 10, 11, or 12, the induced current or potential varies along curves C, F, H and I through successive minima where the conductors of the secondary are midway between the adjacent conductors of the primary and through successive maxima G and J at positions of Fig. 10 and Fig. 12, respectively, the maxima observed are less in magnitude as more and more of the conductors of the primary are displaced beyond conductor 14a. Thus by observing the variation in potential or current as the secondary is moved away from the primary and the passage through the successive maxima and minima, the location of the secondary with respect to the primary may be sensed. Each successive displacement from a position of maximum coupling to a succeeding position of maximum coupling, i. e., from the position of Fig. 6 to the position of Fig. 8, etc. is herein referred to as a phase.

It is thus possible to measure displacement over the whole range of distance between conductors 13 and 14a by observing not only the magnitude of the current, but also the maxima observed as the secondary is moved from position of Fig. 6 to position of Figs. 7, 8, 9, to 12. The arrival at the successive maxima will locate the secondary with respect to the primary together with the magnitude of the induced current or voltage at positions in each phase of the displacement of the secondary, with respect to the primary will give the magnitude of the displacement.

While all of the forms illustrated above employ open loops, i. e., a pair parallel legs connected together at one of their ends, it is not essential that the legs be parallel, but only that the loops be similar and similarly arranged and that the secondary conductors be arranged in a complementary geometry, for example, a mirror image of the arrangement of the primary conductor, as will be illustrated below.

The loops need not be open loops, i. e., possess only one pair of legs. It is possible to employ closed loops such as are illustrated at Figs. 13 and 14, formed by winding a wire in a rectangular loop of more than one turn (shown as three in Figs. 13 and 14) with cross overs 20, 20a and 20b to complete the turn; the legs 18, 18a and 18b on one side of the loop correspond to to the legs 3 and the legs 19, 19a and 19b correspond to the legs 2. Such coils may be joined in series relation in the same manner as in the case of the open loops of the form shown in Figs. 5 and 5a, inclusive.

It will be understood that all of the legs on each side of the loop are insulated from each other along the length and are connected only by conductors to form loops or to form loops in series relation. The secondary legs are insulated from the primary legs and are in inductive relation to each other in the same manner as is described for the open loops.

Fig. 15 illustrates the application of our invention to one form of transducer. The primary is composed of a wire wound in a serpentine winding composed of a series of open loops 21 the legs 22 and 23 of which are connected together by the cross over wire 24, the loops being connected by the cross over wire 25. The legs are parallel and equally spaced. They are positioned in grooves 26 formed in the block 27. The block is formed of a material of high magnetic permeability and this material acts as a magnetic core of the primary. The characteristics and design criteria employed in core design for transformers in order to obtain maximum efficiency are applicable here. If the material has electrical conductivity, the wires are insulated from the block. If the material is electrically non-conductive but of high magnetic permeability (and such materials are well known and commercially available), the wire may be naked, i. e., uninsulated. The core is formed in a rectangular block so that the cross overs 24 and 25 are positioned in air beyond the lateral edges of the core block and therefore the permeability of the volume encompassing the cross overs 24 and 25 being in air is of much lower permeability than the high permeability material employed in the block 27. The stray magnetic fields from these cross overs are thus minimized. The ends 28 and 29 may be connected to a source of alternating current. Spaced from the block 27 is a similar block 30 carrying grooves 31 which are parallel to each other and to the parallel grooves 26. A serpentine winding comprising a plurality of loops 32 positioned in said grooves, with the loops connected in series, each loop composed of legs 33 and 34 joined by cross over 35 and connected in series by cross over 36. The cross overs are placed outside the edges of the block 30 in the manner described in connection with the block 27. The serpentine secondary winding ends 37 and 38 may be connected to an electrical meter.

The blocks are held in position spaced apart by flat springs 39 each spring mounted on the blocks 27 and 30 so that each of the legs 22 and 23 of each of the loops are equally spaced from the legs 33 and 34. The blocks are mounted in a case 40. A rod 41 is connected to the block 30 and passes through the case. With the secondary in position as shown in Fig. 15 and an alternating current imposed on 28 and 29, a maximum voltage is induced in the secondary. As the block 30 is deflected, when the rod 41 is pushed to the right or left, the voltage induced in the secondary varies in the manner described for the form of Figs. 6 to 12, inclusive.

In the forms previously described, the conductors of the primary were disposed in the same plane specifically where the conductors are all cylindrical and of the same diameter with their axis in the same plane. The conductors of the secondary are also similarly disposed in a coplanar fashion with the plane of the secondary parallel to the plane of the primary winding.

However the conductors need not be coplanar or on parallel planes so long as the criteria discussed above are observed. Thus they may be on concentric cylindrical surfaces as is illustrated in Figs. 18 and 24.

In such fashion the principle discussed above is applicable to the measurement of angular displacement, as is illustrated by Figs. 18 to 21, inc.

In this case the serpentine winding is composed of a series of adjacent loops 41 with parallel legs 42 and 43. All legs are spaced equally on the outer surface of an inner cylinder 44. A like serpentine winding composed of like adjacent loops connected in series with legs 45 and 46 spaced equally on the inner surface of outer cylinder 47. The cylinders are of a material having magnetic permeability and are mounted concentrically. The cylinders are grooved to receive the insulated wires. If the coil material is conductive or if the core material is not electrically conductive, the wires may be bare. The cylinders are so spaced as to form an annular air gap 48 between the windings on the opposing faces of the concentric cylinders. The windings are each connected as in the forms previously described in connection with Figs. 6 to 17. Thus, the imposition of an alternating current on one of the windings on cylinder 44 or 47 will induce a current in the other winding. This current will pass from a maximum when the legs of the loops are disposed with their axis perpendicular to the same radii as shown in Fig. 20 and at a minimum when the legs of one of the windings are midway between the legs of the opposing winding as shown in Fig. 21. Thus, the angular displacement between two positions of maximum induction may be measured by calibrating the angular displacement against the induced potential or current in the secondary winding. By arranging the windings of the cylinders so that the legs are not spaced over the entire surfaces of the cylinders, the maxima induced in the secondary will become successively smaller in magnitude as the windings pass over the windings.

This is illustrated in Figs. 20 and 21 where the windings are distributed over but 180° of the cylindrical surface. The current induced on the secondary in the position shown in Fig. 21 will be less than the current induced in the secondary at the following maximum position shown in Fig. 20 in the same manner as described in connection with Figs. 6 to 12.

Having calibrated the instrument against displacement for any voltage across the terminals of the primary, any angular displacement can be sensed by measuring the induced potential or current in the secondary, which voltage is impressed across the primary in a manner which will be understood by those skilled in this art from what has been described herein.

We have illustrated our invention in the examples described above by reference to loops having parallel legs. However, the loops need not be rectangular. Any loop geometry which permits the secondary windings to be positioned with its conductors superposed over one of the legs of the primary loop and on motion to be translated to a position where the secondary is placed so as to be equally influenced magnetically but in opposite senses by the complementary legs of the loop of the secondary, as described above will be sufficient. Such a situation is obtained by connecting a plurality of adjacent conductors of the primary, all of like geometric form, not necessarily straight or parallel lines, such that adjacent conductors are symmetrically placed about any axis of symmetry and in which the conductors in the secondary are geometrically, a mirror image of the arrangement of the conductors in the primary. An exception to this rule is the case of a secondary having but one conductor moving between and over a primary having two or more windings. Functionally this case is included within the generic statement and we intend this statement to include this special case also. In such a system, both generic and special as stated above, all the points on each of the conductors of the secondary move a like proportion of the linear distance between the legs of the primary.

Such a loop, with non-parallel complementary legs, is shown in Figs. 22 and 23 in which the loops are formed with the complementary legs of the loop placed on coplanar radii from a common center as, for example, a disk. A secondary winding placed in like radii of a disk, but displaced from the primary by an air gap, is so positioned that the radial conductors of the secondary are coplanar on a common center which is coaxial with the center of the primary radial conductors and the secondary radial winding may be placed directly over, i. e., axially aligned in the same plane with the radial conductors of the primary. To accomplish this the secondary and primary conductors are positioned at equal angles. On moving from one radial primary conductor to an adjacent radial primary conductor, all parts of the secondary will be equally displaced angularly between the legs. By connecting the radial primary and also the radial secondary conductors in a serpentine winding with all the legs of the loops making equal angles with adjacent legs, one may form a motion sensing device which will indicate angular displacement.

Such a device is illustrated in Figs. 22 and 23. Two annular concentric disks 49 and 50 of material having high magnetic permeability are mounted in plates 51 and 52 of non-magnetic material or material having low magnetic permeability and mounted on shafts 53 and 54 positioned in bearings 55 and 56 in case 57. The opposing faces of 49 and 50 carry conductors 57' and 58 positioned on radii of the disks. The disks are spaced from each other so that the conductors on the respective faces of the disk are separated by an air gap. The conductors 57' and 58 of each disk are connected by cross wires 59 and 60 in a serpentine winding, the legs on each disk being identically spaced over the face of the disks 49 and 50, making equal angles with each other and, for example, over 180° of the disks. The ends of the serpentine windings may be connected to terminals 59' and 60' in the case to permit 180° free rotation of the disk with respect to each other. It will be observed that although the currents in the conductors 57' and 58 are oppositely directed they are not 180° out of phase spatially since the conductors are not parallel.

It will be observed however that the secondary conductors may be positioned with their axis coplanar with the axis of the conductors of the primary and that on angular displacement of the disks 49 and 50, the secondary conductors and all portions thereof are proportionately displaced and the secondary conductors may occupy a position between the primary conductors so that all portions of the secondary are midway between the complementary parts of the primary windings on each side of the secondary. Consequently this form will function in a manner similarly to the forms previously described.

As will be understood from what has been said before, the angular displacement of the disks with respect to each other through 180° of rotation will result in the induction of current and potential in the secondary in successive maxima and minima as described above for the previous forms. By placing the windings over more than 180° of the annular surface, displacement in magnitude greater than 180° can be obtained. As stated previously, instead of the open loops in the form shown in Figs. 22 and 23, I may employ closed loops arranged in series in the manner described hereinabove.

I have described above various forms in which the windings are formed in a serpentine fashion in loops connected in series. The basic requirement is that the direction of current flow in one conductor of the winding be out of phase spatially from the direction of current flow in conductors adjacent thereto on either side of the first mentioned conductor. This was accomplished in the previous examples by a serpentine type of winding in which legs disposed at equal angles (180° or acute) with the legs of all the loops equally spaced and connected in series so that the current in any leg is out of phase with the current in the adjacent legs on either side. Various geometrics may produce the same effect and are for the purposes of this application to be considered as equivalent.

We may, however, accomplish the same result without the use of series connected loops, but by so connecting conductors of the primary and secondary, which are spaced equally each from the other, by any electrical interconnection of the primary and separately of the secondary whereby the currents in any conductor of the primary are opposed in phases to the direction of the current in the adjacent conductors on either side.

For example, we may employ a bifilar winding such as shown in Figs. 24, 25 and 26. This is accomplished by helically winding a cylinder with a conductor which has been bent back upon itself in a flat loop so that the terminals of the wire are adjacent each other, with the legs of the loop wound helically simultaneously keeping the wires all equally spaced in the double helix thus produced. Such a winding may be termed a bifilar double helix winding of uniform pitch.

Thus since the pitch of each helix formed by each branch of the bifilar winding is the same all portions of the conductors will be equally separated from the conductors on either side. When a potential is impressed on the loop by connecting the ends to a potential source, the current flow in adjacent conductors will be in a direction opposite to each other. Such a winding is illustrated in Figs. 24 to 26.

The bifilar winding, composed of two legs 61 and 62 cross-connected in a loop at 63, is wound helically on the external surface of the cylinder 63' formed of material having a high magnetic permeability. The slack conductor leads pass through bores in the cylinder and are connected to terminals 64 and 65. The conductors 61 and 62 are equally spaced from each other over the surface of the cylinder 63', and it will be seen that the direction of current flow in each conductor is opposite, i. e., 180° out of phase to the direction of current flow in the adjacent conductors on each side of the first-mentioned conductor, as illustrated by arrows in Fig. 24.

The cylinder is mounted for axial displacement in the direction of arrows A on square shafts 66 and 67 connected axially at both ends 68 and 69 of the cylinder and passing through suitable bearings 61' mounted on base 70.

A similar bifilar double helical winding composed of legs 71 and 72 connected in a loop by cross over 73 is placed on the inner surface of the cylinder 74, also made of material having a high magnetic permeability. The conductors 71 and 72 of the double helix formed by the bifilar helical winding are on the same pitch and distributed in the same fashion as the conductors 61 and 62. The leads of the windings are connected with desired slack to the terminals 75 and 76.

The cylinders 63 and 74 and the double helixes wound thereon are concentrically, i. e., coaxially, mounted and spaced from each other so that conductors 71 and 72 are separated by an air gap from conductors 61 and 62. The cylinder 63 may be displaced axially by pushing or pulling the rod 66. The conductors 61 and 62 may be moved from position when the axis of the conductor is in the same plane with the conductors 71 and 72, as illustrated in Figs. 24 to 26, or to a position where the windings 61 and 62 are equally spaced from the windings 71 or 72.

The functioning of this device will be substantially identical with the functioning of the device illustrated in Figs. 15 to 17, inclusive.

The shaft 67 may be round and on rotation of the cylinder 63, the helically wound conductor will effectively advance from one conductor 71 to the adjacent conductor 72.

I may also accomplish an electrical and magnetic result, similar to the forms illustrated above, by connecting the conductors of the primary or secondary of the loop arrangement shown in Figs. 5, 13, 17, 18, 23 or 24 by any other electrical interconnection whereby the current flow in adjacent conductors is reversed in direction, one of such arrangements being the bifilar winding described above.

In Figs. 27 and 28 are illustrated elementary wiring diagrams for the primary and for the secondary winding in which bifilar windings are not employed but a similar result is obtained. In Fig. 27 the conductors 78 and 79 are connected by crossovers to give the current direction illustrated by the arrows in Fig. 27. The conductors are equally spaced and parallel, i. e., all parts of each conductor 78 are spaced equally from the adjacent conductor 79. The current flow in one conductor, for example 78, is opposite in phase to the adjacent conductor 79 on either side. We may employ this winding for the secondary or primary and employ the winding shown in any of the forms above for the other winding or may employ the windings of Fig. 27 for both primary and secondary. Fig. 28 illustrates another form of connection which effectuates the same result, as will be apparent from the diagram and the arrows which indicate the relation of the phases of the current in the legs 80 and 81.

Thus the primary or the secondary may be formed of conductors as described above connected either in the manner indicated in Figs. 5, 13, 17, 18, 23, 24, 27, or 28 or both may be wound in any such fashion. Functionally the conductors will be electrically equivalent provided the other conditions specified above are also used.

In the forms described above the conductors of the secondary winding have been moved from a position where the axis of the secondary is superimposed over the axis of the conductors of the primary to a position midway between the conductor of the primary and in such movement the primary and secondary have been moved from a position of maximum to a position of minimum inductive coupling between primary and secondary.

In the forms shown in Figs. 29 to 34, inc., the conductors of the primary are arranged in a pair not side-by-side as in the previous forms but in an axially aligned position, end to end, one of the aligned conductors carrying current 180° out of phase spatially with the current of other conductors in the aligned position. The adjacent ends of the conductors are spaced from each other. Fig. 29 indicates the elementary circuit diagram.

In Figs. 29 and 35 the straight conductors 83 and 84 are in series with their axes aligned, and with ends opposed and spaced from each other with the ends connected to a source of alternating current 82 and the opposite non-adjacent ends connected in series so that the current flow in the conductor 83 is opposed to the flow in conductor 84. In Fig. 29, the adjacent end of conductors 83 and 84 are spaced longitudinally from each other at 86 for a linear distance greater than and in Fig. 35 less than, the length of the straight conductor 85. The secondary 85 is parallel to and coplanar with the conductors 83 and 84 and is of equal length. It is spaced from the conductors 83 or 84 by an air gap illustrated at 85'. With the conductor 85 so placed (Figs. 30 and 36) that the axis of the wire conductor 85 is coplanar with the axis of conductor 83 or 84 and with the conductor 85 between the ends of the conductor 83 (or 84) the wire 85 is at maximum inductive coupling with the wire 83 (or 84) and a maximum current flow is obtained in 85 and measured at meter 87. By moving the conductor in the plane of the conductor 83 and 84, which as stated, have their axis coplanar, 85 takes a position as shown in Fig. 30 where it is entirely within the air gap 86 and midway between the adjacent ends of the conductors 83 and 84, or equally over conductors 83 and 84 as in Fig. 36, a minimum current will be induced in 85, the conductor 85 being at minimum inductive coupling with either 83 or 84. Motion toward 83 or 84 will be in the direction of increasing the induced current and voltage in 86.

The same properties and functions apply if 85 is the primary and conductors 83 and 84 form the secondary.

Figs. 31 to 34 illustrate somewhat schematically an arrangement which embodies the circuit shown in Figs. 29 and 30. The blocks 88 and 89 made of material having high magnetic permeability are arranged in a line with their surfaces 90 and 91 coplanar and spaced from each other by a gap 92 somewhat wider than the width of the magnetic block 93. The block 93, made of a material having a high magnetic permeability, is spaced vertically so that its lower face 94 forms an air gap with the faces 90 and 91 when the block 93 is slid over the top of either 88 or 89.

Suitable mechanical arrangements are provided so that the face 94 traverses a plane parallel to the faces of 90 and 91 as the block 93 is slid thereover. This may be done, as illustrated, by a pair of parallel rods 94' passing through bores in the block 93 and mounted on supports 95 positioned on base 96.

Each of the blocks 88 and 89 has positioned, on their upper faces 90 and 91, loops of wire connected similarly to that shown in Fig. 15, with the parallel equally spaced conductor wires 97 and 98 cross-connected by conductors 99 spaced away from the surface of the blocks 88 and 89 and also connected below the surface of 88 and 89 by conductors 100. The effect of this connection is the same as illustrated in Figs. 29 and 30. The parallel wires 97 and 98 in block 88 being axially aligned with the wires 97 and 98, respectively, of block 89, with the direction of current flow in wires 97 or 98, in each block, being 180° out of phase with the direction of current flow in the complementary wire on the other of the two spaced blocks.

The secondary is wound on the lower face 94 of the block 93 so that they are parallel and connected in series connected loops. Thus the wires 101 and 102 are connected by conductor 103 in a loop with the loops connected in series. The wires 101 and 102 may thus be aligned with the wires 97 and 98 in the manner described in connection with Figs. 29 and 30.

Instead of the gap 92 being somewhat greater than the length of the conductors 101 and 102 as described above, it may be less so that the wires 101 and 102 are always inductively coupled with the wires 97 and 98 of each block respectively. Thus when the conductor of block 93 is entirely over the conductors of block 88 or entirely over those of block 89 a maximum current is induced in the conductors on block 93. When the conductor of the block 93 is spatially equally over those of block 88 and block 89, a minimum current is induced in the conductor of block 93.

The properties and functions described for the forms illustrated in Figs. 31 to 34 inclusive, apply if the winding on block 93 forms the primary and the windings on blocks 88 and 89 form the secondary.

While we have described the forms of Figs. 29 to 34 as including straight conductors, these conductors may be of any shape so long as they are arranged and function in a manner similarly to that described above. Thus for example, twisting the conductors to give them all the same shape other than straight without disturbing the functioning of the device as described above, will come within the scope of my invention as will be understood by those skilled in this art.

While we have described particular embodiments of our invention for purposes of illustration, it should be understood that various modifications and adaptations thereof may be made within the spirit of the invention as set forth in the appended claims.

We claim:

1. A transducer comprising a transformer, said transformer having a primary bifilar winding in a form of a double helix of conductive wire connected together at one end thereof, said helix being of uniform pitch throughout its length, a secondary bifilar winding in the form of a double helix of conductive wire connected together at one end thereof, said second named helix being of uniform pitch throughout the length of said second helix, the pitch of said helixes being the same, said helical windings being coaxial and spaced from each other and means for displacing said helixes from each other in a direction axially of said helixes.

2. A transducer comprising a transformer, said transformer having a primary bifilar winding in a form of a double helix of conductive wire positioned on the surface of a first cylinder, said double helix being of uniform pitch throughout its length and connected together at one end thereof, a secondary bifilar winding in the form of a double helix of conductive wire positioned on the surface of a second cylinder, said second named double helix being of uniform pitch throughout the length of said second helix and connected together at one end thereof, the pitch of said helixes being the same, said cylinders and said helical windings being coaxial and spaced from each other and means for displacing said cylinders from each other in a direction axially thereof.

3. A transducer comprising a transformer, said transformer having a primary bifilar winding in a form of a double helix of conductive wire positioned on a portion of a first cylinder, said double helix being of uniform pitch throughout its length and connected together at one end thereof, a secondary bifilar winding in the form of a double helix of conductive wire positioned on a portion of the surface of a second cylinder, said second named double helix being of uniform pitch throughout the length of said second helix and connected together at one end thereof, the pitch of said helixes being the same, said cylinders and said helical windings being coaxial and spaced from each other, and means for displacing said cylinders from each other in a direction axially thereof, and for moving said secondary winding relative to said primary winding to place at least a portion of one of said windings beyond the other of said windings.

References Cited in the file of this patent
UNITED STATES PATENTS
2,650,352    Childs _____ Aug. 25, 1953